June 2, 1959  C. E. CLOUD  2,888,787
METHOD AND APPARATUS FOR VACUUM PACKING IN PLASTIC
Filed Jan. 11, 1957  7 Sheets-Sheet 1
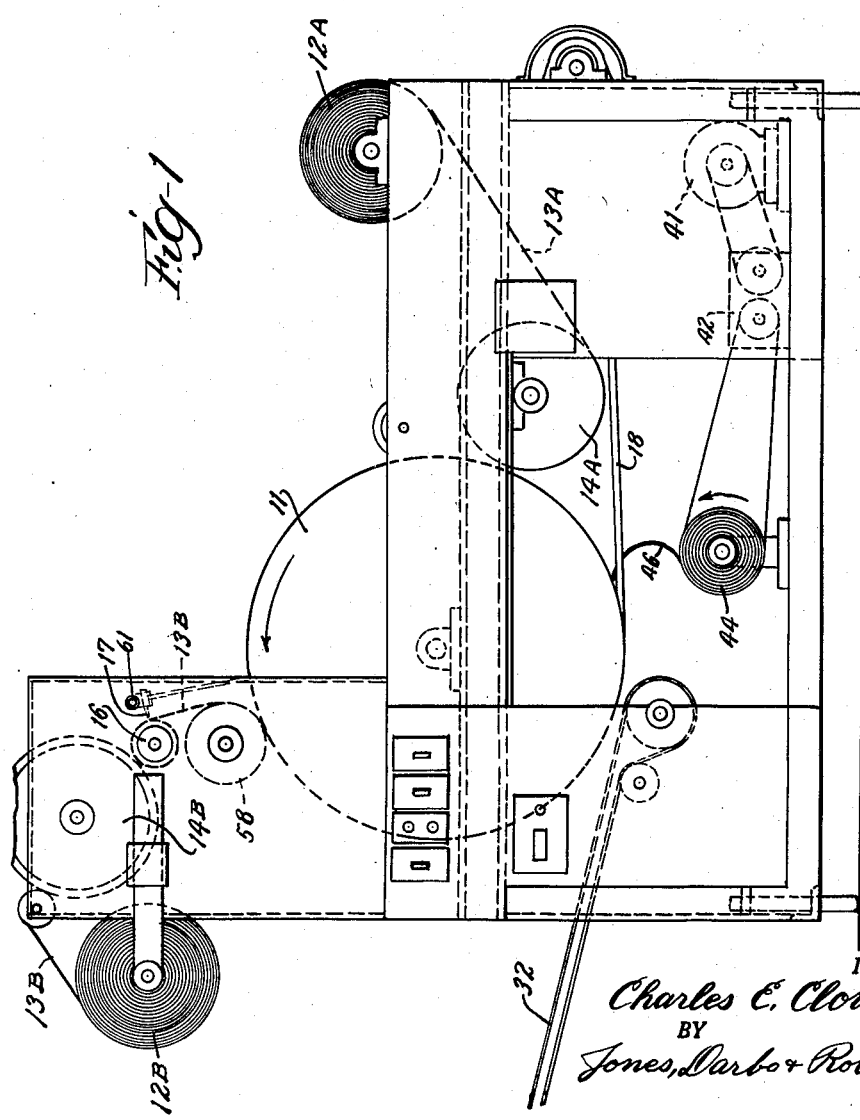
INVENTOR.
Charles E. Cloud
BY
Jones, Darbo & Robertson
Attys.

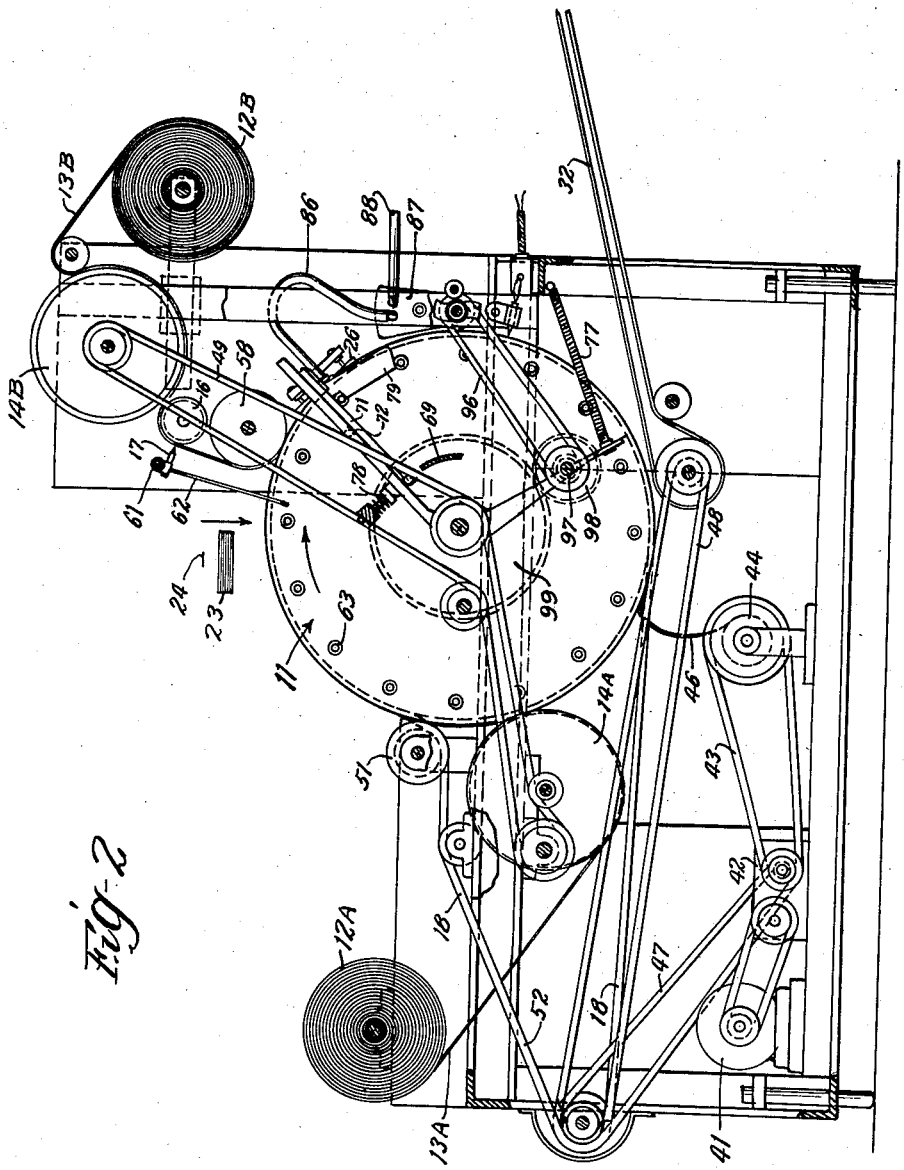

June 2, 1959
C. E. CLOUD
2,888,787
METHOD AND APPARATUS FOR VACUUM PACKING IN PLASTIC
Filed Jan. 11, 1957
7 Sheets-Sheet 3
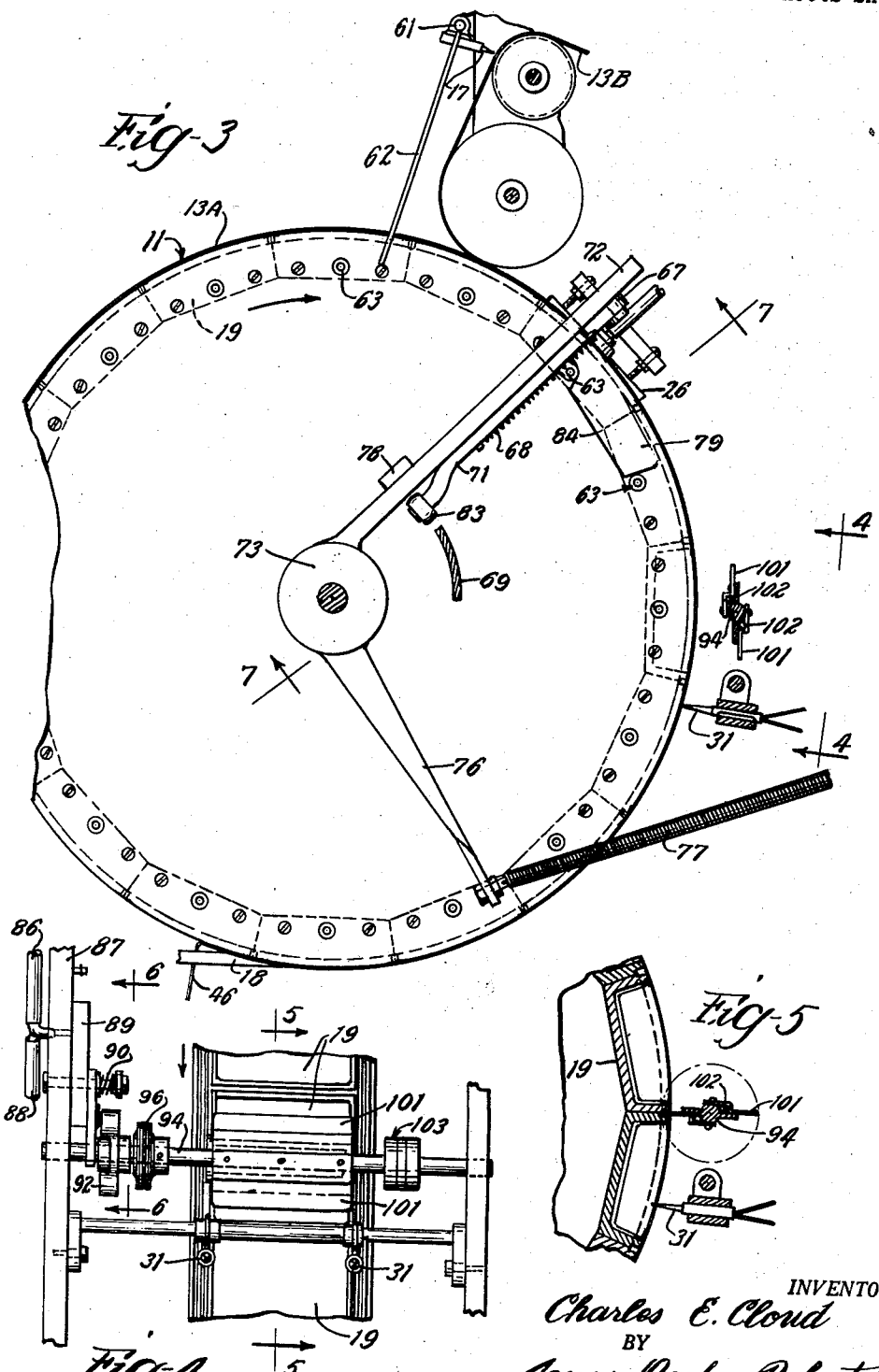
INVENTOR.
Charles E. Cloud
BY
Jones, Darbo & Robertson
Attys.

June 2, 1959
C. E. CLOUD
2,888,787
METHOD AND APPARATUS FOR VACUUM PACKING IN PLASTIC
Filed Jan. 11, 1957
7 Sheets-Sheet 4
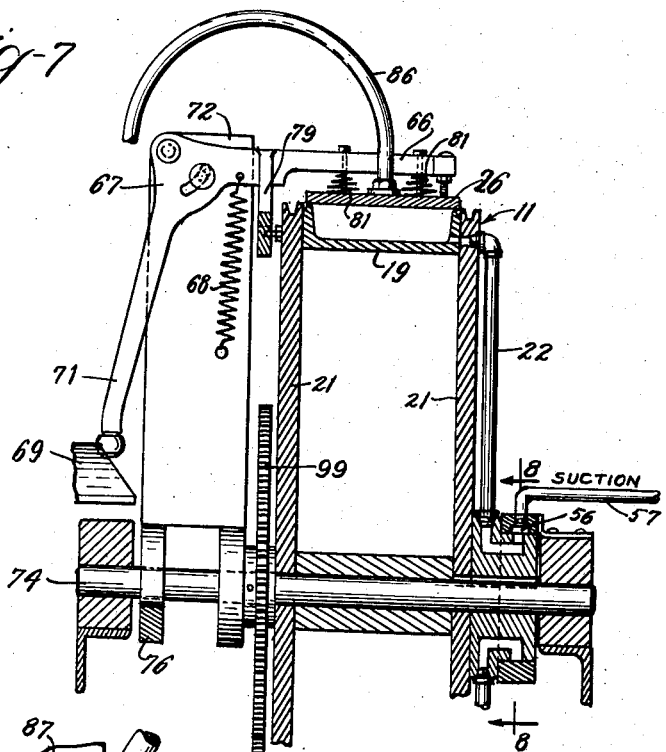
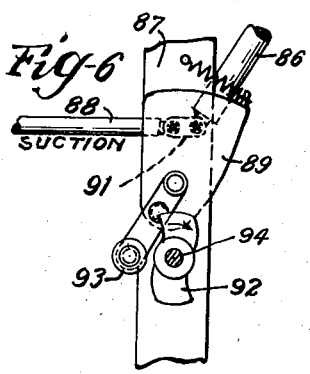
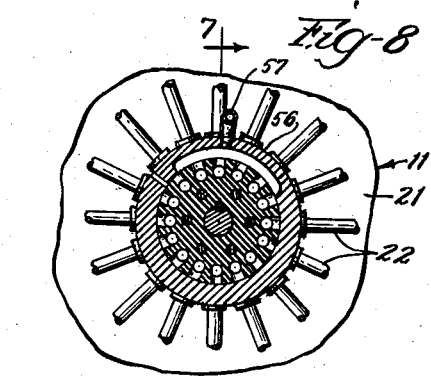
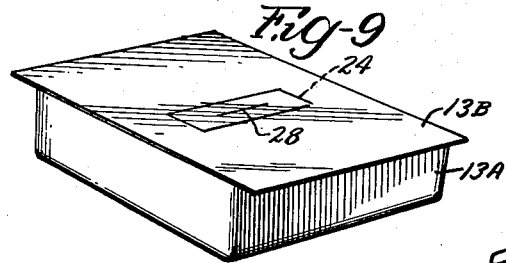
INVENTOR.
Charles E. Cloud
BY
Jones, Darbo & Robertson
Attys.

June 2, 1959           C. E. CLOUD           2,888,787
METHOD AND APPARATUS FOR VACUUM PACKING IN PLASTIC
Filed Jan. 11, 1957           7 Sheets-Sheet 5

INVENTOR.
Charles E. Cloud
BY
Jones, Darbo & Robertson
Attys.

June 2, 1959

C. E. CLOUD 2,888,787

METHOD AND APPARATUS FOR VACUUM PACKING IN PLASTIC

Filed Jan. 11, 1957

INVENTOR:
Charles E. Cloud
BY
Jones, Darbo & Robertson
Attys.

June 2, 1959　　　　　C. E. CLOUD　　　　　2,888,787
METHOD AND APPARATUS FOR VACUUM PACKING IN PLASTIC
Filed Jan. 11, 1957　　　　　　　　　　　　7 Sheets-Sheet 7
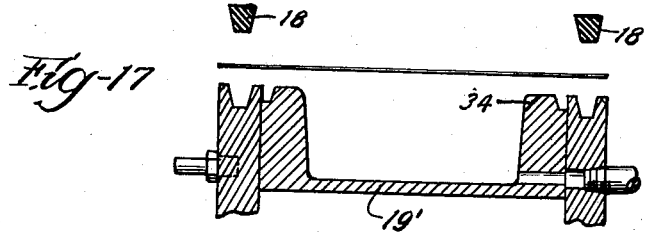
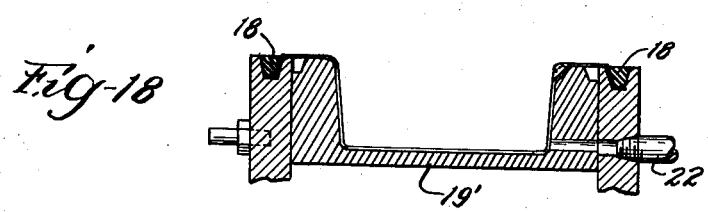
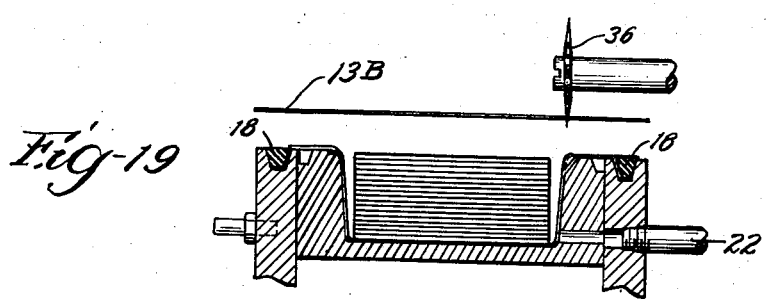
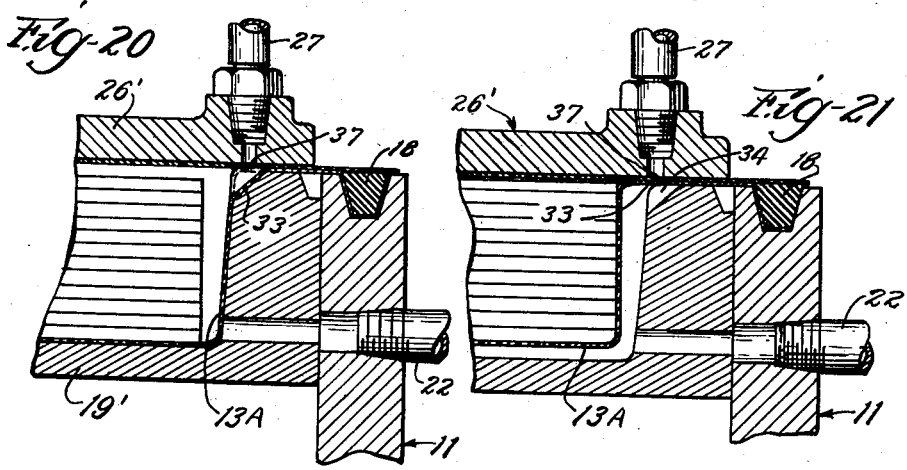
INVENTOR.
Charles E. Cloud
BY
Jones, Darbo & Robertson
Attys.

United States Patent Office 2,888,787
Patented June 2, 1959

2,888,787
METHOD AND APPARATUS FOR VACUUM PACKING IN PLASTIC

Charles E. Cloud, Wilmette, Ill., assignor to William S. Cloud, Wilmette, Ill.

Application January 11, 1957, Serial No. 633,759

25 Claims. (Cl. 53—22)

Although the high-speed packing of various articles in plastic has been a well developed art for some years, the demand for equally satisfactory and high-speed vacuum packing in plastic has not been satisfactory. The demand results from the fact that some foods keep better if the package, and any open cavities in the food, are evacuated.

The best high-speed plastic wrapping has involved the use of two films, at least one of which is sucked into a cup to form a cavity. Then, after filling, the other film is sealed across the top to form a sealed package. Usually, if not always, the plastic has been made stretchable by heat before being drawn into the cup. For highest speed, a multiple of cavities have been provided in the form of a drum, so that the operation was continuous. When rubber hydrochloride is used, the film need not be maintain heated because this material retains its stretchability for a while after being heated. It also remains sufficiently tacky so that when the two films are brought together they adhere to one another. In some instances, the two films have been pre-stretched after heating before being drawn into the cavity or cavities, and the pre-stretching has sometimes included stretching in opposite directions, both lengthwise and transversely.

With the present invention, all of this can be done when desired, and in addition, the air in the filled package can be withdrawn. Furthermore, this evacuation can be accomplished right after the package is first formed by joining the two sheets together, and while the packaged article is still on the forming drum. Preferably the cavities of the forming drum fit the articles closely enough so that maximum evacuation can be attained without loss of efficiency.

According to another aspect of the invention, a dependable system of automatically sealing the evacuating aperture has been worked out, which is exceedingly simple. The package is nearly completely sealed. A small aperture is provided however. In early forms of the invention the aperture has been between the edges, but in the illustrated forms, an aperture is formed through one film. By having the aperture opposite, but slightly spaced from, another layer of the plastic material (either the opposite film or a special insert), the aperture is automatically sealed. This occurs when the evacuation is completed and the draw-in suction, which formed the cavity, is released or overcome. At this stage the atmospheric or external pressure will press the opposite plastic firmly against the evacuating aperture and seal it dependably.

Additional objects and advantages of the invention will be apparent from the following description and from the drawings.

Designation of figures

Fig. 1 is a side elevation of the apparatus chosen to illustrate the invention.

Fig. 2 is a view from the opposite side, with portions removed to show the drive connections for the machine.

Fig. 3 is a view on a larger scale of the main drum and some associated parts.

Fig. 4 is a fragmentary view taken approximately from the line 4—4 of Fig. 3 and showing especially the severing mechanism and evacuation valve.

Fig. 5 is a fragmentary sectional view taken approximately on the line 5—5 of Fig. 4 with the severing blade turned to severing position.

Fig. 6 is a fragmentary sectional view taken approximately along the line 6—6 of Fig. 5, showing the timing valve for the evacuation connection.

Fig. 7 is a fragmentary sectional view taken mainly approximately along the line 7—7 of Fig. 3, and showing especially the evacuating head and its control. The right hand hub is a vertical sectional view on the line 7—7 of Fig. 8.

Fig. 8 is a fragmentary sectional view taken approximately along the line 8—8 of Fig. 7, and showing especially the control of the vacuum to the suction cups.

Fig. 9 is a perspective view of a finished wrapper.

Figs. 17 to 21 are fragmentary views showing successive steps in the formation and evacuation of a package on a modified and simplified form of the invention, in which no valve insert is used.

Intent clause

Although the following disclosure offered for public dissemination is detailed to ensure adequacy and aid understanding, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

General description

According to the illustrated form of the invention, the package is formed on a main drum 11 from two strips of suitable film. The strip 13A first applied to the drum is drawn from a roll 12A and a cover strip 13B is drawn from a roll 12B. Before being applied to the drum, both strips are heated, the first film 13A by heating roll 14A and the second film 13B by heating roll 14B.

If the preferred form of invention is used in which the evacuating aperture is formed is on film, this may be done as the film 13B is drawn around the guide roller 16. Here it is slitted at selected points by a tool 17. Roll 16 may be slotted to receive tool 17, but experience indicates this is not necessary.

Figure 10:
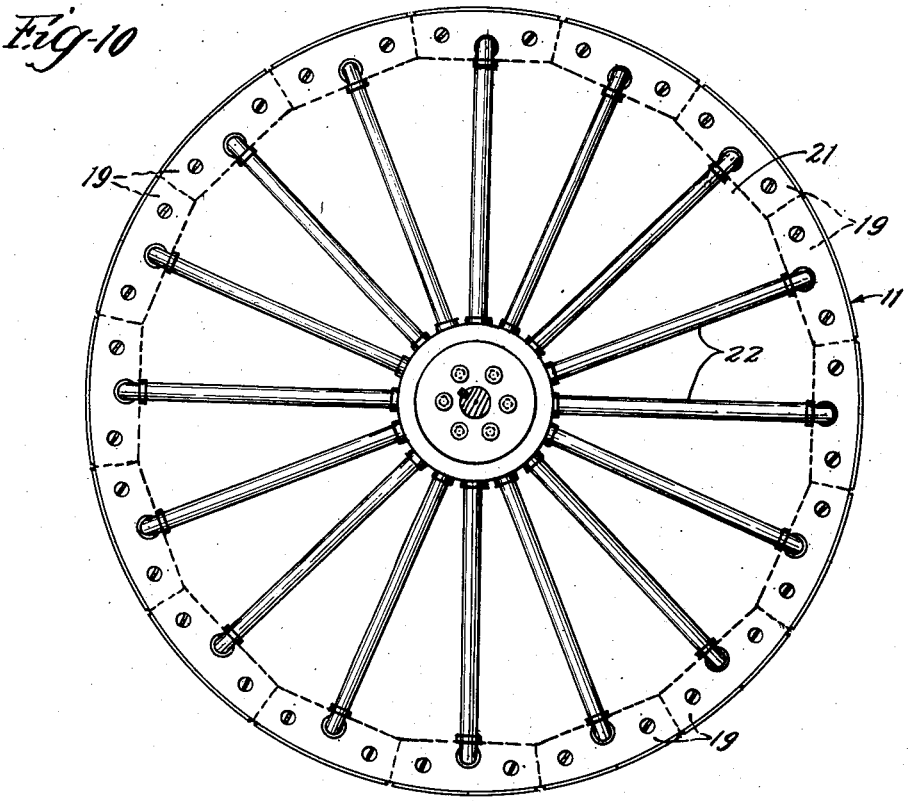
Fig. 10 is a view showing the suction connections to the drum cups.
Figure 11:
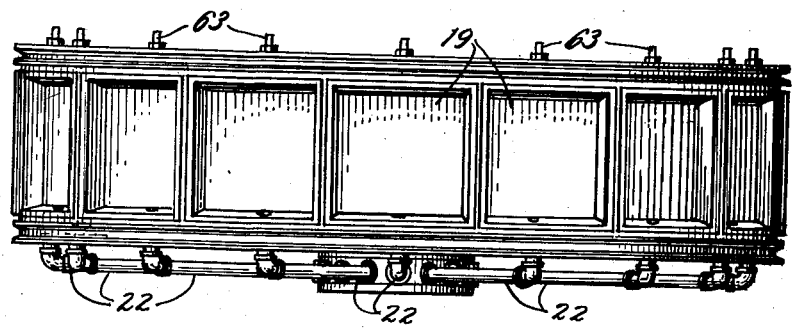
Fig. 11 is a peripheral view of the drum.
Figure 12:
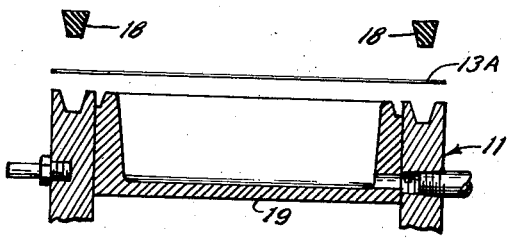
Figs. 12 to 15 are fragmentary sectional views showing successive steps in the production and evacuation of the package.
Figure 13:
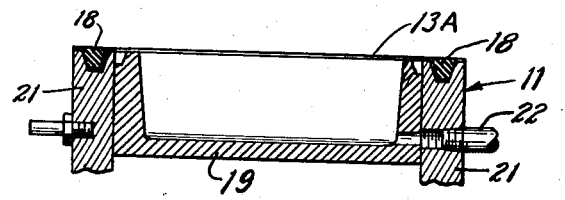
Figure 14:
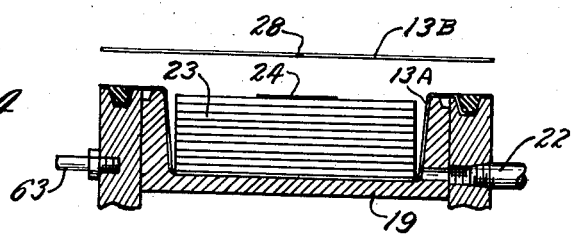

The successive stages in the operations which take place on the main drum 11 are illustrated in Figs. 12 to 16. Fig. 12 merely illustrates diagrammatically the film 13A approaching the drum 11, and the clamping belts 18 also approaching the drum 11 beyond the strip 13A. In Fig. 13, the film 13A has come to rest on the drum 11 where it was pressed against the rims of suction cups 19 by heating drum 14A (Fig. 2). It is held taut across the suction cups 19 by the clamp belts 18, which has thrust the edges of the film 13A into grooves in the peripheries of the side plates 21 of drum 11. In Fig. 14, air has been drawn from cup 19 through pipe 22 to stretch the film 13A into cup 19 by vacuum. Also, the fill 23 has been inserted, and a valve insert 24 has been deposited on top of the fill 23. In addition, the second film 13B, shown diagrammatically, is approaching the drum 11.

Figure 15:
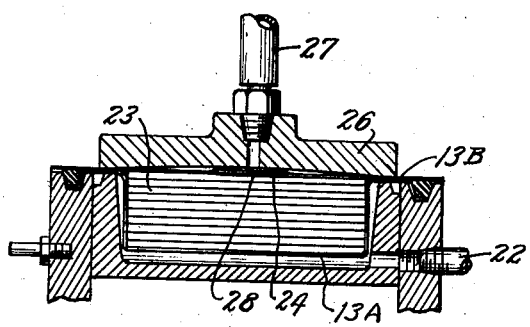

In Fig. 15, the package has been formed and almost completely sealed. Thus the second film 13B has been applied across the drum and sealed to the first film 13A by pressure of roll 58 on the rim of cup 19 (Fig. 2), and a suction head 26 has been pressed against the film 13B sealing itself against this film. In addition, the air within the package thus formed has been drawn through the evacuating aperture 28 in film 13B by hose 27, and thereafter while this evacuation continues, air has been admitted to pipe 22 to press the film 13A closely against the fill 23 to help expel as much as possible of the rarefied air. At the end, this external air pressure has pressed the fill upwardly, pressing valve insert 24 against film 13B thereby sealing the aperture 28. Evacuating head 26 is slightly concave so that aperture 28 will stay open a little longer, to permit more thin residual air to be squeezed out of the package. If a film is used which is elatsic at this stage (whether or not it is elastic without heating) the air is squeezed out first by the tension of the film (as equilibrium is approached). In any event it is preferably squeezed out by external pressure when air is admitted to cup 19. The aperture 28 is sealed when the pressure outside of film 13A squeezes the package firmly against head 26. Best results are attained if the maximum practical vacuum is used for both head 26 and cups 19.

Figure 16:
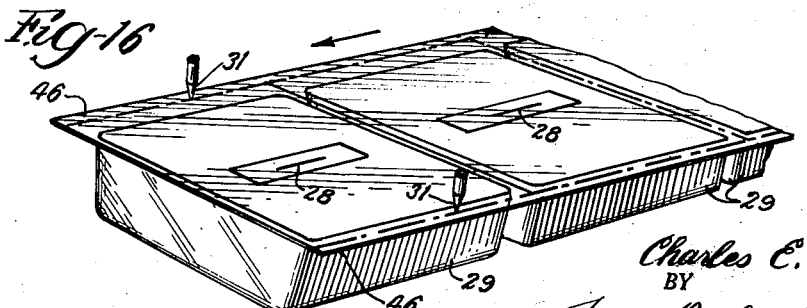
Fig. 16 is a view illustrating the edge trimming of the packages.

In Fig. 16, the left-hand finished package 29 has been severed from the following package 29 except that both are secured to the film edges. Heated devices 31 are trimming the edges from the leading package 29. When this trimming is completed, the leading package 29 will be free to drop onto the conveyor belt 32 (Fig. 1).

The valve insert 24 may be a strip of ordinary pressure-sensitive film tape, but any film may be used that will adhere to film 13B. A label may be printed on it if preferred, in which case it may be larger than is shown.

General description of modification

In the simplified version of the invention shown in Figs. 17 to 21, the use of the separate valve insert 24 is not required. Here the valve function is performed by a portion 33 of the first film 13A.

The illustrated steps of Figs. 17 to 19 are very similar to those of Figs. 12 to 14, with a few exceptions. Each cup 19' is provided with a notch 34 in its side wall. The second film 13B is provided with a continuous line of perforations, positioned to fall over the notch 34, a rotating perforating wheel 36 having been illustrated for producing this line of perforations. (It should be understood that the wheel 36 might be located elsewhere, as cooperating with roll 16 in Fig. 1, or that a perforation can be made directly over each notch 34 after the film is applied.)

In Fig. 20, the suction head 26' has its suction hose 27 (or an aperture leading from it) aligned with the aperture 37 lying over the notch 34. Apertures not over the notch 34 will have been sealed by the film 13A, the marginal edges of the two films having been sealed together except at the notch by pressure between roll 58 and the rim of cup 19', as the film 13B was applied. The evacuation takes place while the parts are as here shown.

In Fig. 21, the aperture 37 has also been sealed by the portion 33 of film 13A, this occurring after the evacuation of the package was completed and air had been admitted on the outside of film 13A.

The remainder of this method may be as illustrated in Fig. 16, with cut-off as in Fig. 5.

Drive mechanism

The apparatus may be driven by an electric motor 41 seen in Fig. 2, through a speed reducing gear unit 42. A belt 43 merely drives the roll 44 for winding up the trimming 46, after it has been released as clamping belts 18 leave drum 11. Belt 47 drives a transfer shaft which in turn drives clamping belts 18 and conveyor drive belt 48. Clamping belt 18 rotates the drum 11, which in turn drives belt 49 for driving heating drums 14A and 14B. The belts 18 are guided into grooves in drum 11 by guide pulleys 51, this being necessary because the reaches 53 of belt 18 are spread apart to permit film 13A to pass between them.

Suction of film into the cavities

The rotation of drums 11 and 14A draws the film 13A from roll 12A around the heating roll or drum 14A from which it is drawn away by main drum 11. As it progresses along the main drum 11, it is quickly clamped by clamp belts 18 which clamp the edges of the sheet as seen best in Fig. 13. Shortly after this clamping occurs, the suction cup to which this portion of the film has been clamped passes to a point where its associated suction pipe 22 comes into communication with suction recess 56 (Figs. 7 and 8). The suction chamber 56 communicates as by suitable pipe 57 with a vacuum tank and pump, not shown. This tank sucks air from all of the cups 19 which communicate with the suction chamber 56, thereby drawing the film down into these cups. One of the purposes of the heating drum 14A is to make the film stretchable. Rubber hydrochloride, available commercially as "Pliofilm" is the preferred material. Unless such a film is used, which remains stretchable and tacky after the heating thereof has been discontinued, or one which is stretchable without being heated at all, the provision of heating devices at the points of stretching and sealing may be desirable.

If desired, the film may be subjected to preliminary stretching before application of the film to the drum, and such stretching may be in both directions. Means for accomplishing such two-way stretching are already known. It may also be applied to the film 13B. Perhaps the simplest form comprises diverging pin-belts moving faster than the surface speed of the heating drum, the pins seizing the edges of the film as it leaves the heating drum.

Piercing of the cover film

In like manner, the cover film 13B is drawn around the heating drum 14B and applied by guide roller 58 to the surface of drum 11 over the filled cavities of the first film. It will be understood that between the time when the film 13A is drawn into one of the cups 19 and the time when the second film 13B is applied thereover, the cup will have passed the filling station and will have been filled automatically or by hand. Also, in the form of the invention shown in Figs. 1 to 16, the valve insert 24 will have been placed on top of the fill at the center thereof.

As the film 13B is drawn around a guide roll 16, it will be pierced or slitted at appropriate points thereon. With the method of Figs. 17 to 21, perforating wheel 36 would be used, near the edge of the sheet. In Fig. 3, there is an oscillating tool 17. Either it may be a self-heated wire or an indirectly heated prick or blade (or wheel) which will not stick to the film. The oscillating tool 17 is actuated in properly timed relation to bring the apertures thus formed into centered relation over the cup. The means for accomplishing this timed actuation is shown in Fig. 2 and, in a larger scale, in Fig. 3. The tool is pivotably mounted on a rock shaft 61 provided with an arm 62 extending into the path of pins 63 carried by drum 11. The pins 63 are seen also in Fig. 11. A suitable return spring (not shown), is provided so that after the pin 63 slides off of the end of arm 62, the arm will swing back until stopped by a suitable stop (not shown), in a position suitable for being engaged by the next pin 63. Arm 62 may be a leaf spring, in which case it will flex to let pin 63 slide out from engagement with it. Movement of rock shaft 61 may be limited. Instead of a rock shaft, a simple hinge may be used. Also the pivotal axis can be vertical instead of horizontal as shown.

Evacuating head and actuation thereof

An oscillating vacuum head 26 is used in the illustrated form of the invention. It is clamped down over a cup 19, moves with it long enough to accomplish its function, then is released from that cup and swings back to its starting position to engage the next cup. For a higher speed two such suction heads can be used, each taking every other cup. They can heat different locations or can operate jointly and move back over two cups at a time, or arranged so that each in its return stroke passes over the other in "leap-frog" manner.

Vacuum head 26 is carried by an arm 66 of bellcrank lever 67. A spring 68 urges the arm 66 downwardly or inwardly, and at the end of a run, a cam 69 (mounted on the machine frame) engages the other arm 71 of bellcrank lever 67, throws arm 66 outwardly and raises the suction head 26 away from the cup 19 on which it had been engaged.

The bellcrank lever 67 is pivotably carried by an arm 72 of a second bellcrank lever 73 which is pivoted on shaft 74 by which the drum 11 is carried. The other arm 76 of bellcrank lever 73 is urged by a return spring 77 in a counterclockwise direction as seen in Fig. 3. When the suction head 26 has been raised, the return spring 77 snaps the entire suction head assembly including bellcrank lever 73 back to its starting position, where it is stopped by a stop device 78. This stop device may be a simple plate as seen in Fig. 3, but for quieter operation, some cushion or spring device is preferred, as illustrated in Fig. 2.

The arm 66 carries a detent plate 79. The relationship of this plate to the arm can perhaps be seen best in Fig. 7, but Fig. 3 shows the face view of plate 79, and also shows it nestled between two pins 63. Only when the detent plate 79 can slip between two pins 63 will the springs 68 draw arm 66 downwardly. With this positioning, the evacuating head 26 is properly aligned with the cup 19 and will seal all around the rim thereof. The evacuating head 26 is pressed against the cup 19 (that is, against the film over the cup 19) by springs 81, which permit it to accommodate itself to the cup.

The pin 63 to the rear of the detent plate 79 pushes against the detent 79 to move the suction head 26 and its entire assembly clockwise with the drum 11. The vacuum connection is made in the manner to be described, and after a brief time, but enough to permit evacuation, is shut off. Air is admitted to the evacuating head so that it may be separated easily from the cup, and about this time, cam 69 is engaged by cam follower roller 83 on arm 71 of bellcrank lever 67 to raise arm 66 and with it evacuating head 26. As soon as detent plate 79 clears the pin 63 behind it, it snaps back to the return position under influence of the spring 77. As it is moving toward the return position, cam 69 is no longer holding arm 66 raised, but it is held raised by the bottom edge 84 of detent plate 79. In other words, the bottom edge 84 slides along pin 63 until it has slid past pin 63 at which time spring 68 immediately causes detent plate 79 to snap in between the two pins 63 thereby lowering the suction or evacuating head 26 onto the next cup.

The suction hose 86 of vacuum head 26 extends, as seen in Fig. 2, to a valve base 87 to which a vacuum pipe 88 is also connected at another port. Vacuum hose or pipe 88 is connected to a vacuum tank which is maintained evacuated by a pump. A valve plate 89 slides against valve base 87, as perhaps seen best in Fig. 4. Flat, polished mating surfaces are held snugly against one another by spring 90 about the pivotal pin. The action of this valve plate is seen better in Fig. 6.

A valving groove 91 is formed on the valving face of valve 89. The valving face of the valve 89 is the face which engages valve base 87. With the valve 89 in the position shown, the valving groove connects the supply vacuum pipe 88 with the hose 86 extending to the evacuating head 26. At the proper time, a cam 92 engages cam follower roller 93 carried by an extension of valve plate 89 to shift the valve 89 in a clockwise direction as seen in Fig. 6. The shift moves the valving groove 91 far enough so that hose 86 is disconnected from supply pipe 87 and is connected instead to the atmosphere. In other words, the groove 91 shifts far enough so that it extends out to the right (Fig. 6) of valve plate 87 and hence is exposed to the atmosphere. The cam 92, and in fact two such cams, are carried by a shaft 94 which is driven by a chain 96 (Fig. 2). The chain 96 is driven by a sprocket 97 which is rigidly associated with a pinion 98 driven by a gear 99 mounted on drum 11. The gear ratio is such as to time the action of the suction valve 89 to perform as described for each cup 19.

Cut-off mechanism

The same shaft 94 which carries cams 92 also carries a pair of cut-off blades 101, seen best in Figs. 3 and 4. They are positioned on shaft 94 to fall between successive cups 19. Each blade is heated by a heating unit 102 seen best in Fig. 3 at the base of each blade 101. These heating units may be of the sheathed or tubular type. A slip ring assembly 103, engaged by brushes not shown, forms the electrical connections for the heaters 102.

As seen in Figs. 3 and 4, the edge trimmers 31, which are also electrically heated, are located a little beyond the cut-off blades 101, in the direction of drum rotation.

Further details

It is preferred that the cups 19 approximately fit the articles to be packaged, so that a minimum of air will have to be withdrawn.

A coated film may be desired especially if it is to be pre-stretched to increase its area before it is applied to the cups and stretched into them. A film at present preferred when heating precedes application to the cups is "Pliofilm" coated on its outer side with Saran, a suitable such film being available on the market, as from Millprint Inc.

If a non-tacky film (that has to be heated at the time of sealing) is used, suitable changes will be made. If danger of sealing the evacuation aperture is avoided, it is less important to hold the suction in the cups 19 during evacuation.

The rim of each cup is surrounded by a channel for severing purposes—to allow the severing tools to pass through the film.

The rims of the cups 19 should extend a trifle above (outwardly beyond) the rim of side plates 21 so that the film will seal against the cup rim when stretched between the sides.

I claim:

1. The method of sealing a fill in an evacuated film wrapper which comprises forming a wrapper of plastic film about the fill with an evacuation aperture in the film and with another piece of film directly opposite the aperture and having unobstructed access to the portion of the film forming the aperture, evacuating air from the inside of the wrapper through said aperture while holding by suction a sufficient portion of the wrapper to prevent the collapse of the wrapper (with resultant bringing of said opposite piece of film against the aperture) until a desired degree of evacuation is completed, and releasing the holding suction while the evacuating suction is maintained so that the higher external pressure on the portion previously held causes a collapsing of the evacuated wrapper to bring the opposite film portion into contact with the film portion surrounding the aperture to seal the aperture, the sealing portions having a tacky relationship with one another.

2. Apparatus for producing evacuated filled plastic film wrappers including means for holding two reels of plastic film, an endless set of suction cups along which this film is applied, means for heating at least parts of this film after it is drawn from the reel to facilitate the drawing thereof into the cups, means for supplying suction to the cups in succession to stretch the film into the cups, means for perforating a second film to form an aperture in pre-determined position to have a specific relationship to the cavity as the second film is applied to the cavity, means for applying the second film across the cup and sealing it to the first film peripherally of the cup while leaving the aperture unsealed and communicating with the cavity formed in the first film, means for applying suction to the aperture while the cavity portion of the first film remains held in the cup by the suction applied thereto, and means for admitting air to the cups in succession while the vacuum is still applied to the apertures; said vacuum applying means including a portion which backs up the apertured film surrounding and adjacent to the aperture to apply a sealing pressure surrounding the aperture in reaction to the increased pressure externally of the cavity forming portion of the first film.

3. The apparatus of claim 2 in which the cavities have relieved portions of their peripheral walls facing the second film whereby the second film when initially applied will be spaced from the film on said relieved portions, and the means forming the apertures being positioned to form apertures in the portions of the second film which will lie opposed to said relieved portions, whereby the sealing pressure after release of the holding suction will seal the first film against the second film surrounding the aperture and thereby seal the aperture.

4. Apparatus for producing evacuated filled plastic film wrappers, including means for holding two reels of plastic film, means for continuously heating a first film after it is drawn from the reel, an endless set of suction cups along which this film is applied, means for supplying suction to the cups in succession to stretch the film into the cups, means for perforating the other film to form an aperture in pre-determined position to have a specific relationship to the cavity as the second film is applied to the cavity, means for applying the second film across the cup and sealing it to the first film peripherally of the cup while leaving the aperture unsealed and communicating with the cavity formed in the first film, and means for applying suction to the aperture while the cavity portion of the first film remains held in the cup by the suction applied thereto; said apparatus including means to seal the aperture while the suction is maintained.

5. Apparatus for producing evacuated filled plastic film wrappers, including means for holding two reels of plastic film, means for continuously heating a first film after it is drawn from the reel, an endless set of suction cups along which this film is applied, means for supplying suction to the cups in succession to stretch the film into the cups, means for perforating the other film to form an aperture in pre-determined position to have a specific relationship to the cavity as the second film is applied to the cavity, means for applying the second film across the cup and sealing it to the first film peripherally of the cup while leaving the aperture unsealed and communicating with the cavity formed in the first film, and means for applying suction to the aperture; said apparatus including means to seal the aperture while the suction is maintained.

6. Apparatus for forming evacuated film-wrap packages including an endless set of cups, means for stretching a film into each cup, means for applying a cover film over each cup after it has passed a filling station without completely sealing the package thus formed, an evacuating head, and head moving means to apply the head successively over packages in cups to move with the cups and evacuate the packages, and to raise the head from the cups and move it in the return direction to co-operate similarly with following cups.

7. Apparatus according to claim 6 in which the cups move about an axis and the head moving means includes a carrier pivoted on the axis, and a subcarrier carrying the head and pivoted to the first carrier to move the head to and from the set; the set having positioning formations adjacent each cup and the subcarrier having a formation adapted to nest with said formations to center the head on the cup as the head moves toward the set and to be pushed by one positioning formation, and to slide along the outside of the positioning formations during the return movement, the subcarrier being biased toward the set and being cammed at the end of its movement with a cup to a position escaping the pushing of the positioning formation, and said carrier being biased in the return direction.

8. The method of vacuum packaging which includes supplying a layer of heat-stretch film to a set of sequential cups and heating the film to make it stretchable; stretching the film into the cups by suction, filling the film cavities thus formed with items to be packaged, applying a second layer of film over the cavities to enclose the items therein; sealing the two layers together along at least most of the periphery of the cavity while leaving an evacuation aperture, applying an evacuation head over cavities in succession in a sealed engagement therewith, and, while the evacuation head successively moves with the cavities, applying suction to the space sealed by said evacuating head to draw air from the package through the aperture, and sealing the aperture; then releasing the head and returning it to a subsequent cavity, and removing the sealed and evacuated package from the cup in which it was formed.

9. The method of vacuum packaging which includes supplying a layer of heat-stretch film to a set of sequential cups and heating the film to make it stretchable; stretching the film into the cups by suction, filling the film cavities thus formed with items to be packaged, applying a second layer of film over the cavities to enclose the items therein, sealing the two layers together along at least most of the periphery of the cavity while leaving an evacuation aperture disposed for easy sealing, applying an evacuation head over cavities in succession in sealed engagement therewith, and, while the evacuation head successively moves with the cavities, applying suction to the space sealed by said evacuating head to draw air from the package through the aperture, and sealing the aperture; then releasing the head and returning it to a subsequent cavity, and removing the sealed and evacuated package from the cup in which it was formed.

10. The method of vacuum packaging which includes supplying a layer of heat-stretch film to a set of successive cups and heating the film to make it stretchable; stretching the film into the cups by suction, filling the film cavities thus formed with items to be packaged, applying a second layer of film over the cavities to enclose the items therein, sealing the two layers together along at least most of the periphery of the cavity while leaving an evacuation aperture, applying an evacuation head over cavities in succession in sealed engagement therewith, and, while the evacuation head successively moves with the cavities, applying suction to the space sealed by said evacuating head to draw air from the package through the aperture, and sealing the aperture.

11. The method of vacuum packaging which includes supplying a layer of heat-stretch film to a set of successive cups and heating the film to make it stretchable; stretching the film into the cups by suction, filling the film cavities thus formed with items to be packaged, applying a second layer of film over the cavities to enclose the items therein, sealing the two layers together along at least most of the periphery of the cavity while leaving an evacuation aperture, applying an evacuation head over cavities in succession in sealed engagement therewith, and, while the evacuation head is thus sealed, applying suction to the space sealed by the head to draw air from the package; and sealing the aperture.

12. Apparatus for forming evacuated film-wrap packages including an endless set of successive cups, means for stretching a film into each cup including means on opposite sides of the cup for clamping the film, with the film resting on the periphery of the cup and suction means for drawing the film into the cup, means for applying a cover film over each cup and sealing it to the drawn film after it has passed a filling station without completely sealing the package thus formed, an evacuating head, and head moving means to apply the head over a package in a cup to move with the cup and evacuate the package, and to raise the head from the cup and move it in the return direction to cooperate similarly with a following cup.

13. Apparatus for forming evacuated film-wrap packages including an endless set of successive cups, each cup being shaped to approximately fit the article to be packaged, means for stretching a film into each cup, means for applying a cover film over each cup and sealing it to the drawn film after it has passed a filling station without completely sealing the package thus formed, an evacuating head, and head moving means to apply the head over a package in a cup to move with the cup and evacuate the package, and to raise the head from the cup and move it in the return direction to co-operate similarly with a following cup.

14. The method of vacuum packaging which includes supplying a layer of heat-stretch film to a series of cups in succession and heating the film to make it stretchable; stretching the film into the cups by suction while holding it beyond the edges of the cup, applying a second layer of film over the cavities to enclose items therein, sealing the two layers together along at least most of the periphery of the cavity while leaving an evacuation aperture, successively applying an evacuation head over the cups with the packages therein in sealed engagement therewith, and, while the evacuation head is thus sealed, applying suction to the space sealed by the head to draw air from the package; and sealing the aperture.

15. The method of vacuum packaging which includes supplying a layer of heat-stretch film to a series of cups and heating the film to make it stretchable; stretching the film into the cups by suction, inserting in the film cavities thus formed items to be packaged approximately fitting the cavity, applying a second layer of film over the cavities to enclose items therein, sealing the two layers together along at least most of the periphery of the cavity while leaving an evacuation aperture, successively applying an evacuation head over the cups with the packages therein in sealed engagement therewith, and, while the evacuation head is thus sealed, applying suction to the space sealed by the head to draw air from the package; and sealing the aperture.

16. The method of vacuum packaging which includes supplying a layer of heat-stretch film to a series of cups and heating the film to make it stretchable; stretching the film into the cups by suction, applying a second layer of film in substantially flat condition over the cavities to enclose items therein, sealing the two layers together along at least most of the periphery of the cavity while leaving an evacuation aperture, successively applying an evacuation head over the cups with the packages therein in sealed engagement therewith, and, while the evacuation head is thus sealed, applying suction to the space sealed by the head to draw air from the package; and sealing the aperture.

17. The method of vacuum packaging which includes supplying a layer of heat-stretch film to a series of cups and heating the film to make it stretchable; stretching the film into the cups, inserting in the film cavities thus formed items to be packaged, applying a second layer of film to form a package but leaving an aperture therein, evacuating the package while subjecting the film adjacent the aperture to a suction sufficient to avoid vacuum-closing of the aperture, sealing the aperture, and severing the packages from one another.

18. The method of vacuum packaging which includes supplying a layer of heat-stretch film to a series of cups and heating the film to make it stretchable; stretching the film into the cups by suction, inserting in the film cavities thus formed items to be packaged, applying a second layer of film over the cavities to enclose the items, sealing the two layers together along at least most of the periphery of the cavity while leaving an evacuation aperture, successively applying an evacuation head over the cups with the packages therein in sealed engagement therewith, and, while the evacuation head is thus sealed, applying suction to the space sealed by the head to draw air from the package while maintaining the shape of the cavity initially; and sealing the aperture.

19. The method of vacuum packaging which includes supplying a layer of heat stretch film to a series of cups and heating the film to make it stretchable; stretching the film into the cups by suction, inserting in the film cavities thus formed items to be packaged, applying a second layer of film over the cavities to enclose the items, sealing the two layers together along at least most of the periphery of the cavity while leaving an evacuation aperture, successively applying an evacuation head over the cups with the packages therein in sealed engagement therewith, and, while the evacuation head is thus sealed, applying suction to the space sealed by the head to draw air from the package while maintaining the shape of the cavity initially but letting it collapse against the item being packaged at an increased state of internal vacuum; and sealing the aperture.

20. The method of vacuum packaging which includes supplying a layer of heat-stretch film to a cup and heating the film to make it stretchable; stretching the film into the cup by suction, filling the film cavity thus formed with an item to be packaged, applying a second layer of film over the cavity to enclose the item therein, sealing the two layers together along at least most of the periphery of the cavity while leaving an evacuation aperture, applying an evacuation head over the cup with the package therein in sealed engagement therewith, applying suction to the space sealed by the head to draw air from the package; and sealing the aperture.

21. The method of vacuum packaging which includes supplying a layer of heat-stretch film to a cup and heating the film to make it stretchable; stretching the film into the cup by suction, filling the film cavity thus formed with an item to be packaged, applying a second layer of film over the cavity to enclose the item therein, sealing the two layers together along at least most of the periphery of the cavity while leaving an evacuation aperture, applying an evacuation head over the cup with the package therein in sealed engagement therewith, applying suction to the space sealed by the head to draw air from the package; and applying air in the cup to squeeze the first layer of film toward the item being packaged while continuing the evacuation and sealing the aperture.

22. The method of vacuum packaging which includes supplying a layer of heat-stretch film to a cup and heating the film to make it stretchable; stretching the film into the cup by suction, filling the film cavity thus formed with an item to be packaged, applying a second layer of film over the cavity to enclose the item therein, sealing the two layers together along at least most of the periphery of the cavity while leaving an evacuation aperture, applying an evacuation head over the cup with the package therein in sealed engagement therewith, applying suction to the space sealed by the head to draw air from the package; maintaining a suction condition in the cup initially during the evacuation and applying air in the cup to squeeze the first layer of film toward the item being packaged while continuing the evacuation and sealing the aperture.

23. Apparatus for forming evacuated film-wrap packages including an endless set of cups, means for stretching a film into each cup, means for applying a cover film over each cup after an opportunity has been afforded for placing a fill to be sealed in the cup between the films but without completely sealing the package thus formed, an evacuating head, and head moving means to apply the head successively over packages in cups to move with the cups and evacuate the packages, and to raise the head from the cups and move it in the return direction to co-operate similarly with following cups.

24. Apparatus for forming evacuated film-wrap packages including an endless set of successive cups, means for stretching a film into each cup including means on opposite sides of the cup for clamping the film, with the film resting on the periphery of the cup and suction means for drawing the film into the cup, means for applying a cover film over each cup and sealing it to the drawn film after an opportunity has been afforded for placing a fill to be sealed in the cup between the films but without completely sealing the package thus formed, an evacuating head, and head moving means to apply the head over a package in a cup to move with the cup and evacuate the package, and to raise the head from the cup and move it in the return direction to cooperate similarly with a following cup.

25. Apparatus for forming evacuated film-wrap packages including an endless set of successive cups, each cup being shaped to approximately fit the article to be packaged, means for stretching a film into each cup, means for applying a cover film over each cup and sealing it to the drawn film after an opportunity has been afforded for placing a fill to be sealed in the cup between the films but, without completely sealing the package thus formed, an evacuating head, and head moving means to apply the head over a package in a cup to move with the cup and evacuate the package, and to raise the head from the cup and move it in the return direction to cooperate similarly with a following cup.

References Cited in the file of this patent

UNITED STATES PATENTS

| | | |
|---|---|---|
| 2,549,123 | Osterhof | Apr. 17, 1951 |
| 2,712,208 | Campbell | July 5, 1955 |
| 2,736,150 | Loew | Feb. 28, 1956 |

UNITED STATES PATENT OFFICE
CERTIFICATE OF CORRECTION

Patent No. 2,888,787                                                June 2, 1959

Charles E. Cloud

It is hereby certified that error appears in the printed specification of the above numbered patent requiring correction and that the said Letters Patent should read as corrected below.

Column 1, line 18, for "satisfactory" read -- satisfied --; column 3, line 25, for "elatsic" read -- elastic --.

Signed and sealed this 8th day of March 1960.

(SEAL)
Attest:

KARL H. AXLINE
Attesting Officer

ROBERT C. WATSON
Commissioner of Patents